(12) United States Patent
Chen

(10) Patent No.: US 10,386,685 B2
(45) Date of Patent: Aug. 20, 2019

(54) PIXEL STRUCTURE, LCD PANEL, AND LCD DEVICE

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 128 days.

(21) Appl. No.: 15/557,807

(22) PCT Filed: May 26, 2017

(86) PCT No.: PCT/CN2017/086114
§ 371 (c)(1),
(2) Date: Sep. 12, 2017

(87) PCT Pub. No.: WO2018/126604
PCT Pub. Date: Jul. 12, 2018

(65) Prior Publication Data
US 2018/0292699 A1 Oct. 11, 2018

(30) Foreign Application Priority Data
Jan. 4, 2017 (CN) .......................... 2017 1 0004916

(51) Int. Cl.
*G02F 1/1362* (2006.01)
*G02F 1/1368* (2006.01)

(52) U.S. Cl.
CPC ........ *G02F 1/13624* (2013.01); *G02F 1/1368* (2013.01); *G02F 1/136227* (2013.01); *G02F 1/136286* (2013.01); *G02F 2201/121* (2013.01)

(58) Field of Classification Search
CPC .. G02F 1/13624; G02F 1/136227; G09G 3/36
See application file for complete search history.

(56) References Cited

U.S. PATENT DOCUMENTS 5,473,451 A * 12/1995 Kazurov ............. G02F 1/13624
345/93
6,011,530 A * 1/2000 Kawahata ........... G02F 1/13624
345/212

(Continued)

FOREIGN PATENT DOCUMENTS

CN 201072484 Y 6/2008
CN 202003648 * 10/2011 ............... G09G 3/36

(Continued)

OTHER PUBLICATIONS

International Search Report of PCT Patent Application No. PCT/CN2017/086114 dated Sep. 28, 2017.

*Primary Examiner* — Benyam Ketema

(57) ABSTRACT

Disclosed are a pixel structure, an LCD panel and an LCD device. The pixel structure includes scan lines and data lines perpendicularly intersected with each other to form pixel areas in a matrix form. Each pixel area includes a pixel electrode, a first active switch and a second active switch. A gate of the first active switch and a gate of the second active switch are connected to the corresponding scan line, and a drain of the first active switch is connected to the corresponding data line, and a source of the first active switch is connected to the corresponding pixel electrode. A drain of the second active switch is connected to a reference voltage, and a source of the second active switch is connected to the pixel electrode of the next row and disposed together with the corresponding pixel electrode at the pixel electrode of the same column.

17 Claims, 9 Drawing Sheets

(56) References Cited

U.S. PATENT DOCUMENTS

| | | | | |
|---|---|---|---|---|
| 8,179,349 B2* | 5/2012 | Liao | .................... | G09G 3/3659 |
| | | | | 345/696 |
| 8,581,816 B2* | 11/2013 | Park | .................... | G09G 3/3648 |
| | | | | 345/204 |
| 2006/0192745 A1* | 8/2006 | Yamazaki | ........... | G02F 1/13624 |
| | | | | 345/100 |
| 2010/0097367 A1* | 4/2010 | Kitayama | ............ | G09G 3/3614 |
| | | | | 345/213 |

FOREIGN PATENT DOCUMENTS

| | | |
|---|---|---|
| CN | 102402960 A | 4/2012 |
| CN | 106681072 A | 5/2017 |

\* cited by examiner

PIXEL STRUCTURE, LCD PANEL, AND LCD DEVICE

FIELD OF INVENTION

The present invention relates to the technical field of liquid crystal display (LCD), in particular to a pixel structure, an LCD panel, and an LCD device.

BACKGROUND OF INVENTION

1. Description of the Related Art

To meet market requirements, the resolution and refresh frequency of Thin Film Transistor-Liquid Crystal Display (TFT-LCD) devices become increasingly higher, so that the pixel charging time becomes increasingly smaller. For example, a 120 Hz UD (3840P×2160P) product has a pixel charging time of 1/120/2164≈3.85 microseconds. The increasingly smaller pixel charging time causes an increasingly smaller pixel charging rate which seriously affects the display effect of a TFT-LCD screen.

2. Summary of the Invention

Therefore, it is a primary objective of the present invention to overcome the drawbacks of the prior art by providing a pixel structure, an LCD panel, and an LCD device capable of improving the pixel charge rate.

To achieve the aforementioned and other objectives, the present invention provides a pixel structure, comprising:
a plurality of scan lines;
a plurality of data lines, perpendicularly intersected with the plurality of scan lines to form a plurality of pixel areas in a matrix form;
wherein each of the pixel areas comprises:
  a pixel electrode;
  a first active switch, including a gate, a source, and a drain, wherein the gate of the first active switch is connected to the corresponding scan line, and the drain of the first active switch is connected to the corresponding data line, and the source of the first active switch is connected to the corresponding pixel electrode; and
  a second active switch, including a gate, a source and a drain, wherein the gate of the second active switch and the gate of the first active switch are connected to the same scan line, and the drain of the second active switch is connected to a reference voltage, and the source of the second active switch is connected the pixel electrode disposed at the next row of the corresponding pixel electrode and in the same column of the corresponding pixel electrode.

To achieve the aforementioned and other objectives, the present invention further provides an LCD panel, comprising: a pixel structure, wherein the pixel structure comprises:
a plurality of scan lines;
a plurality of data lines, perpendicularly intersected with the plurality of scan lines to form a plurality of pixel areas in a matrix form;
wherein each of the pixel areas comprise:
  a pixel electrode;
  a first active switch, including a gate, a source, and a drain, wherein the gate of the first active switch is connected to the corresponding scan line, and the drain of the first active switch is connected to the corresponding data line, and the source of the first active switch is connected to the corresponding pixel electrode; and
  a second active switch, including a gate, a source and a drain, wherein the gate of the second active switch and the gate of the first active switch are connected to the same scan line, and the drain of the second active switch is connected to a reference voltage, and the source of the second active switch is connected to pixel electrode disposed at the next row of the corresponding pixel electrode and in the same column of the corresponding pixel electrode.

To achieve the aforementioned and other objectives, the present invention further provides an LCD device, comprising: an LCD panel and a housing fixed to the LCD panel, and the LCD panel comprising a pixel structure, wherein the pixel structure comprises:
a plurality of scan lines;
a plurality of data lines, perpendicularly intersected with the plurality of scan lines to form a plurality of pixel areas in a matrix form;
wherein each of the pixel areas comprises:
  a pixel electrode;
  a first active switch, including a gate, a source, and a drain, wherein the gate of the first active switch is connected to the corresponding scan line, and the drain of the first active switch is connected to the corresponding data line, and the source of the first active switch is connected to the corresponding pixel electrode; and
  a second active switch, including a gate, a source and a drain, wherein the gate of the second active switch and the gate of the first active switch are connected to the same scan line, and the drain of the second active switch is connected to a reference voltage, and the source of the second active switch is connected to the pixel electrode disposed at the next row of the corresponding pixel electrode and in the same column of the corresponding pixel electrode.

In a preferred embodiment of the present invention, the first active switch and second active switch in the same pixel area are connected to the same scan line, and the corresponding pixels are charged through the first active switch while the pixels of the next row are discharged by the second active switch. When the pixels of the next row are charged, the scan time becomes the charging time, and the charging time of the pixels is extended to improve the charging rate of the pixels.

BRIEF DESCRIPTION OF THE DRAWINGS

The technical solution of the preferred embodiment of the present invention may be elaborated by the following simple introduction of the drawings required for describing the invention, and the drawings illustrate some embodiments of the present invention. It is noteworthy that persons having ordinary skills in the art may further have other drawings based on these drawings without paying any creative effort.

DESCRIPTION OF THE PREFERRED EMBODIMENTS

Other features and advantages of the present invention will become apparent in the following detailed description of the preferred embodiments with reference to the accompanying drawings, in which: Exemplary embodiments are illustrated in referenced figures of the drawings. It is intended that the embodiments and figures disclosed herein are to be considered illustrative rather than restrictive.

Figure 1:
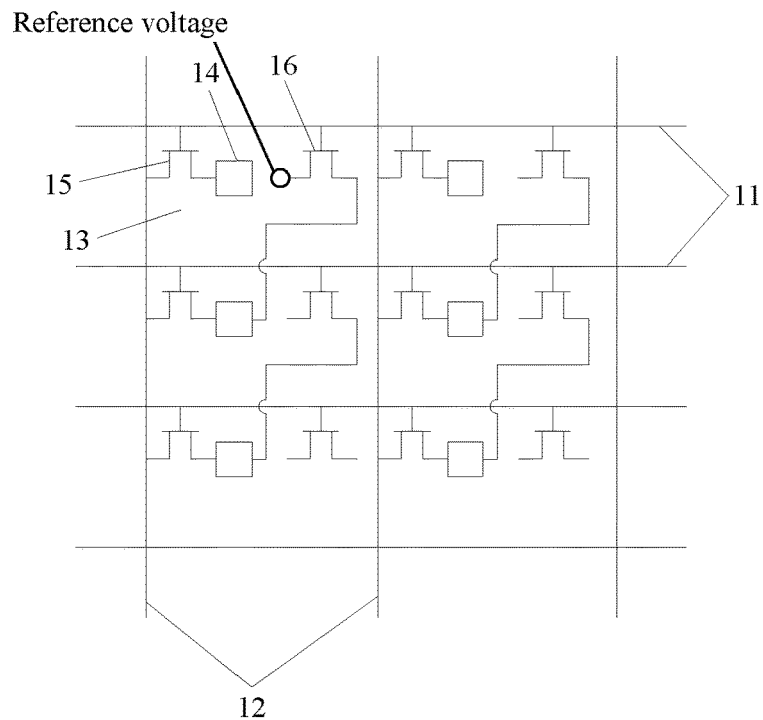
FIG. 1 is a schematic view showing a partial pixel structure in accordance with a preferred embodiment of the present invention.

With reference to FIG. 1 for a schematic view showing a partial pixel structure in accordance with a preferred embodiment of the present invention, the pixel structure comprises a plurality of scan lines 11 and a plurality of data lines 12 perpendicularly intersected with one another to form a plurality of pixel areas 13 in a matrix form.

Each of the pixel area 13 includes a pixel electrode 14, a first active switch 15 and a second active switch 16. Both of the first active switch 15 and second active switch 16 include a gate, a source and a drain, and the gate of the first active switch 15 and the gate of the second active switch 16 are connected to the corresponding scan line 11, and the drain of the first active switch 15 is connected to the corresponding data line 12, and the source of the first active switch 15 is connected to the corresponding pixel electrode 14. The drain of the second active switch 16 is connected to a reference voltage, and the source of the second active switch 16 is connected to the pixel electrode 14 disposed at the next row of the corresponding pixel electrode 14 and in the same column of the corresponding pixel electrode 14.

Specifically, the scan lines 11 are arranged parallel to the horizontal direction, and the scan lines 11 are equidistantly spaced. The data lines 12 are arranged parallel to the vertical direction, and the data lines 12 are equidistantly spaced. Two adjacent left and right data line 12 and two adjacent top and bottom scan lines 11 enclose and form a pixel area 13, and a liquid crystal is placed into the pixel area 13 to form a pixel. In the pixel area 13, the gate of the first active switch 15 and the gate and of the second active switch 16 are connected to the top scan line 11, and the drain of the first active switch 15 is connected to the left data line 12, and the source of the first active switch 15 is connected to the pixel electrode 14 of the pixel area 13, and the source of the second active switch 16 is connected to the corresponding pixel electrode 14 of the next row, and the drain of the second active switch 16 is connected to a reference voltage.

In a preferred embodiment, the drain of the second active switch 16 is connected to a common electrode, and the common electrode is connected to the reference voltage.

The common electrode supplies a reference voltage to the liquid crystal, and the drain of the second active switch 16 is connected to the common electrode, so as to simplify the layout of the voltage source and skip the trouble of wiring.

In a preferred embodiment, the first active switch 15 and the second active switch 16 are thin film transistors such as a top-gate thin film transistor or a bottom-gate gate thin film transistor.

In a preferred embodiment, the pixel area 13 further includes a pixel. The charging rate of the pixel is affected by the charging time significantly. To prevent the polarization of the liquid crystal molecules, the voltages adjacent to both ends of the liquid crystal are opposite, and the charging process of the pixel is actually divided into two stages:

1. Discharging Stage: The previous electric charge remained in the pixel is offset.

2. Charging Stage: The voltage of the pixel is charged from the reference voltage to a target voltage.

The ratio of the discharging time to the scan time seriously affects the charging rate of the pixel, so that the charging rate of the pixel can be improved by reducing the ratio of the discharging time to the scan time.

With the pixel structure in accordance with a preferred embodiment of the present invention, when the driving voltage for conducting both first active switch 15 and second active switch 16 at the same time is inputted to the scan line 11, the data signal is inputted to the data line 12 to drive the first active switch 15 to charge the corresponding pixel. Since the drain of the second active switch 16 is connected to the reference voltage, therefore the pixel electrode 14 connected to the second active switch 16 keeps the previous pixel voltage and becomes the reference voltage before the next data signal is inputted to charge the pixel. As a result, after the charge of the row of pixels is completed, the scan time of the next row of pixels becomes the charging time, so that the charging time of the pixels is extended to improve the charging rate of the pixels.

In a preferred embodiment, the conduction voltage of the first active switch 15 is equal to the conduction voltage of the second active switch 15. When a driving voltage is inputted into a row of scan lines 11, the first active switch 15 and second active switch 16 connected to the scan line 11 are conducted, and the first active switch 15 charges the row of pixels, and the pixel voltage of the pixel electrode 14 connected to the second active switch 16 is increased up to a reference voltage to discharge the pixels of the next row, wherein the driving voltage is greater than or equal to the conduction voltage.

In a preferred embodiment, the conduction voltage of the first active switch 15 is unequal to the conduction voltage of the second active switch 16. When a driving voltage is inputted to a row of scan lines 11, the first active switch 15 and second active switch 16 connected to the scan line 11 are conducted, and the first active switch 15 charges the row of pixels, and the pixel voltage of the pixel electrode 14 connected to the second active switch 16 is increased up to the reference voltage to discharge the pixels of the next row, wherein the driving voltage is greater than or equal to the larger one of the conduction voltage of the first active switch 15 and the conduction voltage of the second active switch 16.

In a preferred embodiment, the source of the second active switch 16 of each pixel area 13 is connected to the pixel electrode 14 disposed at the next row of the corresponding pixel electrode 14 and in the same column of the corresponding pixel electrode 14 through a via. The source of the second active switch 16 is connected to the corresponding pixel electrode 14 of the next row through the via without the need of winding to skip the trouble of wiring.

Figure 2A:
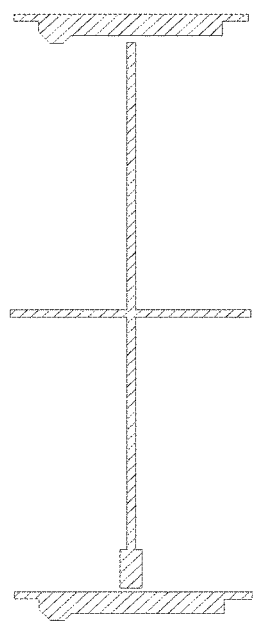
FIG. 2a is a schematic view showing a partial first mask pattern of an array substrate in accordance with a preferred embodiment of the present invention.
Figure 2B:
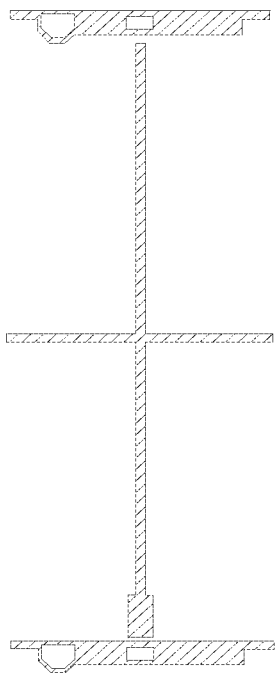
FIG. 2b is a schematic view showing a partial second mask pattern of an array substrate in accordance with a preferred embodiment of the present invention.
Figure 3A:
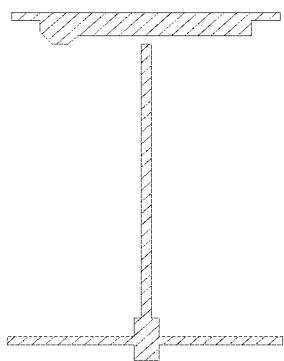
FIG. 3a is a schematic view showing another partial first mask pattern of an array substrate in accordance with a preferred embodiment of the present invention.
Figure 3A:

In FIGS. 2a~3g or 3a~3g, the manufacture of the array substrate of the pixel structure in accordance with a preferred embodiment of the present invention includes five processes:

In the first process, a coating (such as A1) is coated onto a glass substrate, and a photoresist and a mask are applied, and photolithography, etching, and photoresist removal are performed to obtain the partial first mask pattern as shown in FIG. 2a or 3a.

Figure 3B:
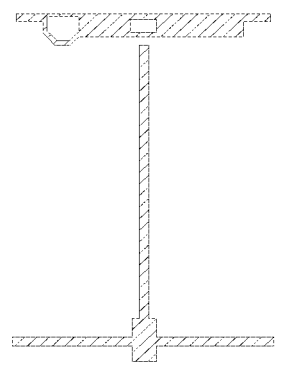
FIG. 3b is a schematic view showing another partial second mask pattern of an array substrate in accordance with a preferred embodiment of the present invention.
Figure 3B:

In the second process, a transparent insulating layer such as a GiNx layer is deposited onto the glass substrate after the first process, and then an AS layer such as a-si is deposited, and the photoresist and mask are applied, and the photolithography etching, and photoresist removal are performed to obtain a second partial mask pattern as shown in FIG. 2a or 3b.

Figure 2C:
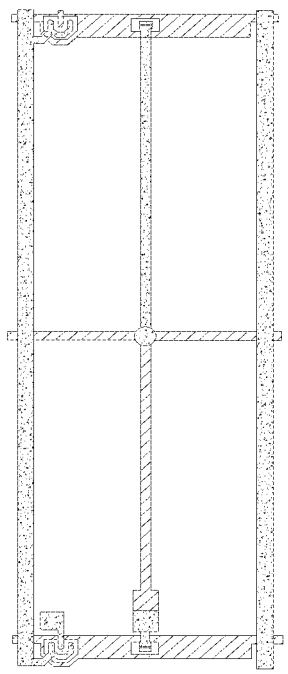
FIG. 2c is a schematic view showing a partial third mask pattern of an array substrate in accordance with a preferred embodiment of the present invention.
Figure 3C:
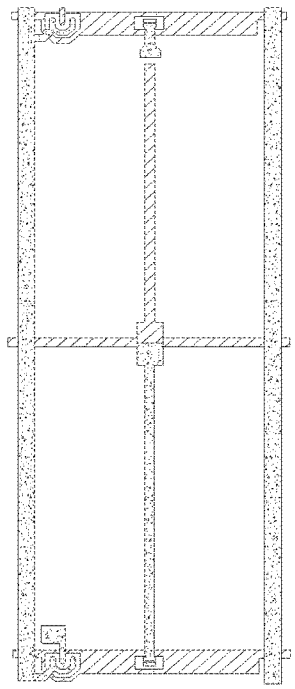
FIG. 3c is a schematic view showing another partial third mask pattern of an array substrate in accordance with a preferred embodiment of the present invention.

In the third process, the glass substrate is further coated with A1 after second process, and the photoresist and mask are applied and the photolithography and photoresist removal are performed to obtain a third partial mask pattern as shown in FIG. 2c or 3c.

Figure 2D:
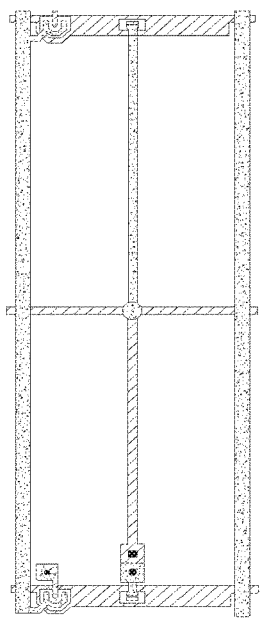
FIG. 2d is a schematic view showing a partial fourth mask pattern of an array substrate in accordance with a preferred embodiment of the present invention.
Figure 3D:
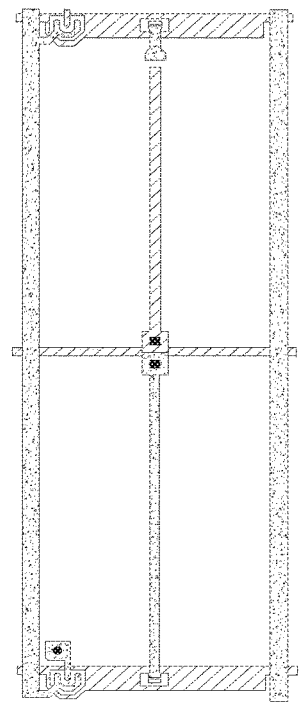
FIG. 3d is a schematic view showing another partial fourth mask pattern of an array substrate in accordance with a preferred embodiment of the present invention.

In the fourth process, a transparent insulating layer such as GiNx layer is further deposited onto the glass substrate after the third process, and the photoresist and mask are applied and the photolithography and photoresist removal are performed to obtain a fourth partial mask pattern as shown in FIG. 2d or 3d, wherein the middle circle at the middle of the drawings represents the via.

Figure 2E:
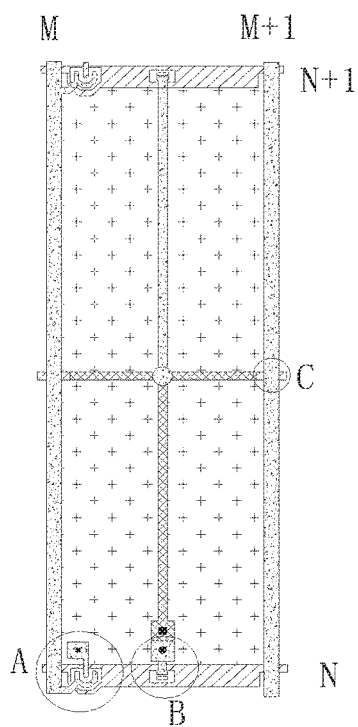
FIG. 2e is a schematic view showing a partial fifth mask pattern of an array substrate in accordance with a preferred embodiment of the present invention.
Figure 3E:
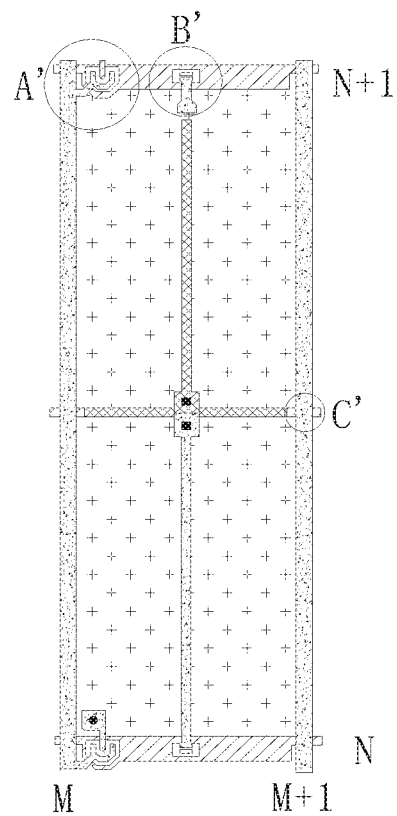
FIG. 3e is a schematic view showing another partial fifth mask pattern of an array substrate in accordance with a preferred embodiment of the present invention.

In the fifth process, the glass substrate is coated with ITO after the fourth process, and the photoresist and mask are applied and the photolithography and photoresist removal are performed to obtain a fifth partial mask pattern as shown in FIG. 2e or 3e.

Figure 2F:
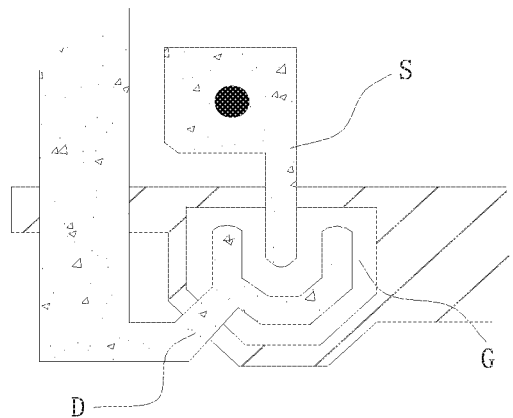
FIG. 2f is a blowup view of Section A of FIG. 2e.
Figure 2G:
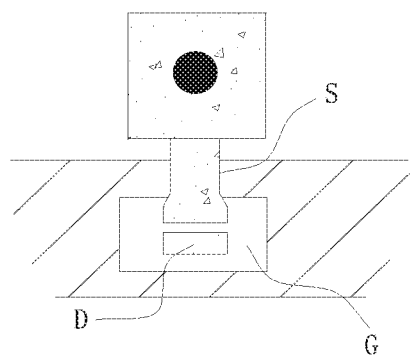
FIG. 2g is a blowup view of Section B of FIG. 2e.

The $N^{th}$ row and $(N+1)^{th}$ row in FIG. 2e are positions where the scan lines 11 are laid, and the $M^{th}$ column and $(M+1)^{th}$ column are positions where the $M^{th}$ column and $(M+1)^{th}$ column data lines 12 are laid, and C is the contact of the common electrode. FIG. 2f is a blowup view of Section A of FIG. 2e, and FIG. 2g is a blowup view of Section B of FIG. 2e. If an active switch is added to the positions A and B each, S, D, and G represent the source, drain, and gate of the active switch respectively. Wherein, N and M are natural numbers.

Figure 3F:
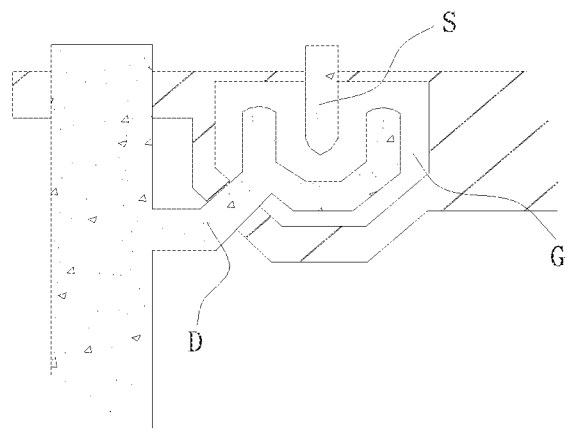
FIG. 3f is a blowup view of Section A' of FIG. 3e.
Figure 3G:
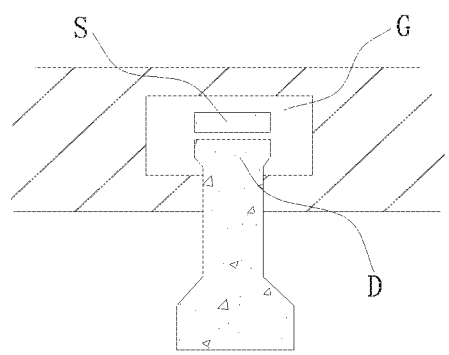
FIG. 3g is a blowup view of Section B' of FIG. 3e.

In FIG. 3e, the $N^{th}$ row and $(N+1)^{th}$ row are positions where the scan line 11 is laid, and the $M^{th}$ column and $(M+1)^{th}$ column are position where the $M^{th}$ column and $(M+1)^{th}$ column data line 12 are laid, and C' is the contact of the common electrode. FIG. 3f is a blowup view of Section A' of FIG. 3e, and FIG. 3g is a blowup view of Section B' of FIG. 3e, and S, D, and G represent the contacts of the source, drain and gate of the active switch respectively.

Figure 4:
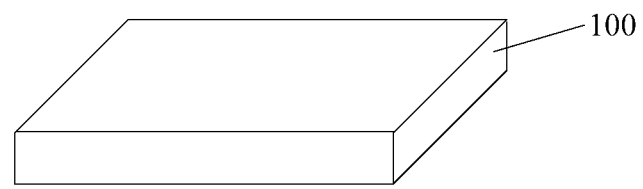
FIG. 4 is a schematic view showing a partial structure of an LCD in accordance with a preferred embodiment of the present invention.

With reference to FIG. 4 for a schematic view of an LCD panel 100 in accordance with a preferred embodiment of the present invention, the LCD panel 100 may be used in a device such as mobile phone, computer, tablet PC, or TV.

Figure 5:
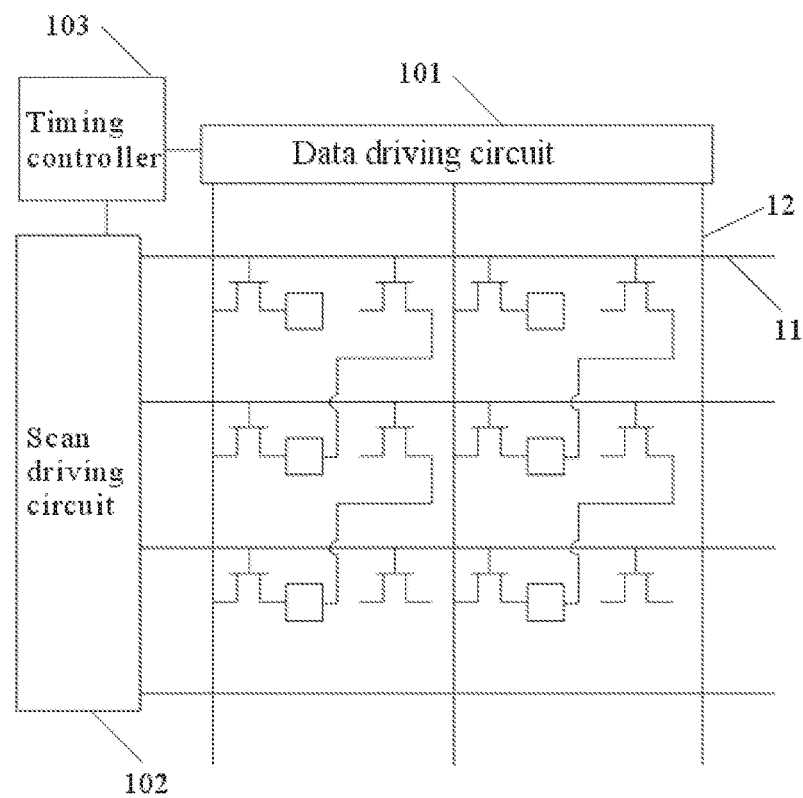
FIG. 5 is a schematic circuit diagram of a driving circuit of an LCD in accordance with a preferred embodiment of the present invention.

With reference to FIG. 5, the LCD panel 100 comprises a pixel structure and a driving circuit for driving the pixel structure. The pixel structure is the one described above, and thus will not be described again.

The driving circuit includes a scan driving circuit 101, a data driving circuit 102 and a timing controller 103, wherein the scan driving circuit 101 is connected to a scan line 11, and the data driving circuit 102 is connected to a data line 12, and the timing controller 103 is connected to the scan driving circuit 101 and the data driving circuit 102 for controlling the scan driving circuit 101 and the data driving circuit 102 to output signals to the scan line 11 and the data line 12 respectively.

The scan driving circuit 101 inputs scan driving signals to the scan line 11 one by one, and the data driving circuit 102 inputs data signals to the data line 12. After the scan line 11 is opened, a row of pixels corresponding to the data signal are charged, while the pixels of the next row are being discharged. Specifically, the scan driving circuit 101 inputs a driving voltage to the scan line 11 to electrically conduct the first active switch 15 and the second active switch 16 at the same time, and the data driving circuit 102 inputs a data signal through the first active switch 15 to charge the corresponding pixel. In the meantime, the drain of the second active switch 16 is connected to a reference voltage, the pixel voltage of a pixel electrode 14 connected to the second active switch 16 is increased up to a reference voltage, and the pixels of the next row are discharged, so that after the charge of a row of pixels is completed and the pixels of the next row are charged, the scan time of the pixels of the next row becomes the charging time, so that the charging time of the pixels is extended, and the charging rate of the pixel is increased, so as to provide a good display effect of the LCD panel 100.

Figure 6:
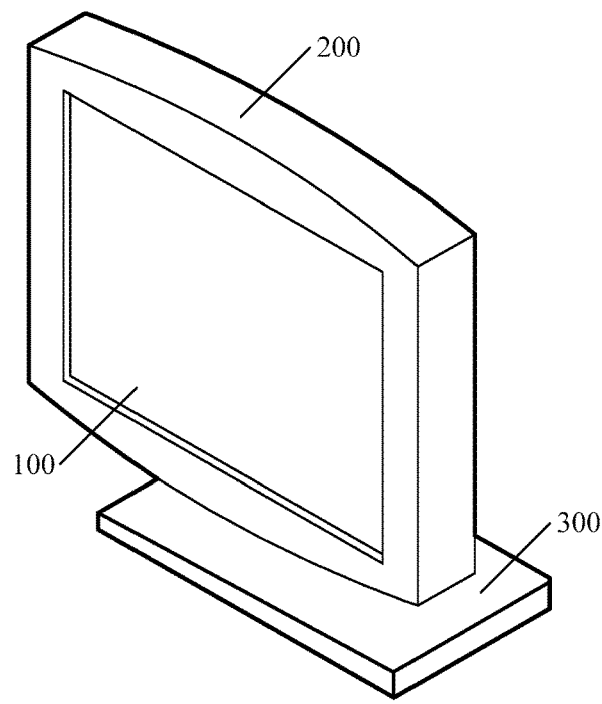
FIG. 6 is a schematic view of an LCD device in accordance with a preferred embodiment of the present invention.

With reference to FIG. 6 for a schematic view of an LCD device in accordance with a preferred embodiment of the present invention, the LCD device comprises an LCD panel 100 and a housing 200 fixed to the LCD panel. The LCD panel 100 has been described above, and thus will not be repeated.

The LCD device further comprises a base 300 such as a tabletop for setting the display device stably.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pixel structure, comprising:
   a plurality of scan lines;
   a plurality of data lines, perpendicularly intersected with the plurality of scan lines to form a plurality of pixel areas in a matrix form;
   wherein each of the pixel areas comprises:
   a pixel electrode;
   a first active switch, including a gate, a source, and a drain, wherein the gate of the first active switch is connected to the corresponding scan line, and the drain of the first active switch is connected to the corresponding data line, and the source of the first active switch is connected to the corresponding pixel electrode; and a second active switch, including a gate, a source and a drain, wherein the gate of the second active switch and the gate of the first active switch are connected to the same scan line, and the drain of the second active switch is connected to a reference voltage, and the source of the second active switch is connected to the pixel electrode disposed at the next row of the corresponding pixel electrode and in the same column of the corresponding pixel electrode;

wherein the pixel area further includes a pixel, and the first active switch has a conduction voltage unequal to the conduction voltage of the second active switch;

when a driving voltage is inputted to the scan lines of a row, the first active switch and second active switch connected to the scan lines charge the pixels of the row through the first active switch, and the pixel voltage of the pixel electrode connected to the second active switch is increased up to a reference voltage to discharge the pixels of the next row, and the driving voltage is greater than or equal to the larger one of the conduction voltage of the first active switch and the conduction voltage of the second active switch.

2. The pixel structure of claim 1, wherein the drain of the second active switch is connected to a common electrode and the common electrode is connected to a reference voltage.

3. The pixel structure of claim 1, wherein the source of the second active switch of each pixel area is connected to the pixel electrode disposed at the next row of the corresponding pixel electrode in the same column of the corresponding pixel electrode through a via.

4. The pixel structure of claim 1, wherein the pixel area further includes a pixel, and the first active switch has a conduction voltage equal to the conduction voltage of the second active switch;

when a driving voltage is inputted to a row of scan lines, the first active switch and second active switch connected to the scan lines are conducted, and the pixels of the row are charged by the first active switch, and pixel voltage of the pixel electrode connected to the second active switch is increased up to a reference voltage to discharge the pixels of the next row, and the driving voltage is greater than or equal to the conduction voltage.

5. The pixel structure of claim 1, wherein the first active switch is a top-gate thin film transistor or a bottom-gate gate thin film transistor.

6. The pixel structure of claim 1, wherein the second active switch is a top-gate thin film transistor or a bottom-gate gate thin film transistor.

7. An LCD panel, comprising a pixel structure, wherein the pixel structure comprises:
a plurality of scan lines;
a plurality of data lines, perpendicularly intersected with the plurality of scan lines to form a plurality of pixel areas in a matrix form;
wherein each of the pixel areas comprises:
a pixel electrode;
a first active switch, including a gate, a source, and a drain, wherein the gate of the first active switch is connected to the corresponding scan line, and the drain of the first active switch is connected to the corresponding data line, and the source of the first active switch is connected to the corresponding pixel electrode; and a second active switch, including a gate, a source and a drain, wherein the gate of the second active switch and the gate of the first active switch are connected to the same scan line, and the drain of the second active switch is connected to a reference voltage, and the source of the second active switch is connected to the pixel electrode disposed at the next row of the corresponding pixel electrode and in the same column of the corresponding pixel electrode;

wherein the pixel area further includes a pixel, and the first active switch has a conduction voltage unequal to the conduction voltage of the second active switch;

when a driving voltage is inputted to a row of scan lines, the first active switch and second active switch connected to the scan lines are conducted, and the pixels of the row are charged by the first active switch, and the pixel voltage of the pixel electrode connected to the second active switch is increased up to a reference voltage to discharge the pixels of the next row, and the driving voltage is greater than or equal to the larger one of the conduction voltage of the first active switch and the conduction voltage of the second active switch.

8. The LCD panel of claim 7, wherein the drain of the second active switch is connected to a common electrode and the common electrode is connected a reference voltage.

9. The LCD panel of claim 7, wherein the source of the second active switch of each pixel area is connected to the pixel electrode disposed at the next row of the corresponding pixel electrode and in the same column of the corresponding pixel electrode through a via.

10. The LCD panel of claim 7, wherein the pixel area further includes a pixel, and the first active switch has a conduction voltage equal to the conduction voltage of the second active switch;

when a driving voltage is inputted to a row of scan lines, the first active switch and second active switch connected to the scan lines are conducted, and the pixels of the row are charged by the first active switch, and the pixel voltage of the pixel electrode connected to the second active switch is increased up to a reference voltage to discharge the pixels of the next row, and the driving voltage is greater than or equal to the conduction voltage.

11. The LCD panel of claim 7, wherein the first active switch is a top-gate thin film transistor or a bottom-gate gate thin film transistor.

12. The LCD panel of claim 7, wherein the second active switch is a top-gate thin film transistor or a bottom-gate gate thin film transistor.

13. An LCD device, comprising an LCD panel and a housing fixed to the LCD panel, and the LCD panel comprising a pixel structure, wherein the pixel structure comprises:
a plurality of scan lines;
a plurality of data lines, perpendicularly intersected with the plurality of scan lines to form a plurality of pixel areas in a matrix form;
wherein each of the pixel areas comprises:
a pixel electrode;
a first active switch, including a gate, a source, and a drain, wherein the gate of the first active switch is connected to the corresponding scan line, and the drain of the first active switch is connected to the corresponding data line, and the source of the first active switch is connected to the corresponding pixel electrode; and a second active switch, including a gate, a source and a drain, wherein the gate of the second active switch and the gate of the first active switch are connected to the same scan line, and the drain of the second active switch is connected to a reference voltage, and the source of the second active switch is connected to the pixel electrode disposed at the next row of the corresponding pixel electrode and in the same column of the corresponding pixel electrode;

wherein the pixel area further includes a pixel, and the first active switch has a conduction voltage unequal to the conduction voltage of the second active switch;

when a driving voltage is inputted to a row of scan lines, the first active switch and second active switch connected to the scan lines are conducted, and the pixels of the row are charged by the first active switch, and the pixel voltage of the pixel electrode connected to the second active switch is increased up to a reference voltage to discharge the pixels of the next row, and the driving voltage is greater than or equal to the larger one of the conduction voltage of the first active switch and the conduction voltage of the second active switch.

14. The LCD device of claim 13, wherein the drain of the second active switch is connected to a common electrode and the common electrode is connected to a reference voltage.

15. The LCD device of claim 13, wherein the source of the second active switch of each pixel area is connected to the pixel electrode disposed at the next row of the corresponding pixel electrode and in the same column of the corresponding pixel electrode through a via.

16. The LCD device of claim 13, wherein the pixel area further includes a pixel, and the first active switch has a conduction voltage equal to the conduction voltage of the second active switch;

when a driving voltage is inputted to a row of scan lines, the first active switch and second active switch connected to the scan lines are conducted, and the pixels of the row are charged by the first active switch, and the pixel voltage of the pixel electrode connected to the second active switch is increased up to a reference voltage to discharge the pixels of the next row, and the driving voltage is greater than or equal to the conduction voltage.

17. The LCD device of claim 13, wherein the first active switch is a top-gate thin film transistor or a bottom-gate gate thin film transistor, and the second active switch is a top-gate thin film transistor or a bottom-gate gate thin film transistor.

* * * * *